(12) United States Patent
Duffy

(10) Patent No.: US 12,299,777 B2
(45) Date of Patent: May 13, 2025

(54) WRITING INSTRUMENT AND METHOD

(71) Applicant: SOCIÉTÉ BIC, Clichy (FR)

(72) Inventor: David Duffy, Zurich (CH)

(73) Assignee: SOCIÉTÉ BIC, Clichy (FR)

( * ) Notice: Subject to any disclaimer, the term of this patent is extended or adjusted under 35 U.S.C. 154(b) by 152 days.

(21) Appl. No.: 18/154,909

(22) Filed: Jan. 16, 2023

(65) Prior Publication Data

US 2023/0230296 A1    Jul. 20, 2023

(30) Foreign Application Priority Data

Jan. 17, 2022   (EP) .................................... 22305036

(51) Int. Cl.
| | |
|---|---|
| *G06T 15/00* | (2011.01) |
| *G06F 3/01* | (2006.01) |
| *G06F 3/0354* | (2013.01) |
| *G06T 7/13* | (2017.01) |
| *G06T 11/00* | (2006.01) |

(52) U.S. Cl.
CPC ............ *G06T 11/001* (2013.01); *G06F 3/016* (2013.01); *G06F 3/03545* (2013.01); *G06T 7/13* (2017.01)

(58) Field of Classification Search
CPC ......... B43K 29/08; G06T 11/001; G06T 7/13; G06F 3/03545; G06F 3/016
USPC ........................................................ 345/418
See application file for complete search history.

(56) References Cited

U.S. PATENT DOCUMENTS

| | | | |
|---|---|---|---|
| 10,671,186 B2 | 6/2020 | Ribeiro et al. | |
| 11,620,599 B2 * | 4/2023 | Moran ................... | G06Q 10/04 705/7.17 |
| 2015/0212602 A1 | 7/2015 | Lor et al. | |
| 2017/0084139 A1 | 3/2017 | Rank et al. | |
| 2017/0269691 A1 | 9/2017 | Fleureau et al. | |
| 2017/0364167 A1 * | 12/2017 | Ribeiro ................. | G06F 3/0442 |
| 2020/0293112 A1 * | 9/2020 | Richter ................... | G06F 3/011 |

(Continued)

FOREIGN PATENT DOCUMENTS

KR          100807930 B1      2/2008

OTHER PUBLICATIONS

Extended European Search Report issued in European Application No. EP 22 30 5036.0 on Jun. 27, 2022 (10 pages).

(Continued)

*Primary Examiner* — Phu K Nguyen

(74) *Attorney, Agent, or Firm* — Bookoff McAndrews, PLLC

(57) ABSTRACT

A computer implemented method for computing a plurality of virtual texture waveform definitions, comprising: obtaining first texture data at least partially characterising a texture of an existing writing surface, obtaining second texture data at least partially characterising an intended texture experienced by a user when the haptic writing instrument when writing on the existing writing surface, generating virtual texture data by modifying the first texture data based on at least the second texture data, segmenting the virtual texture data into at least first and second regions representing, respectively, at least a first texture type and a second texture type, generating at least first and second virtual texture waveform definitions corresponding, respectively, to the first and second texture types, and outputting at least the first and second virtual texture waveform definitions.

20 Claims, 9 Drawing Sheets

(56) References Cited

U.S. PATENT DOCUMENTS

2022/0382375 A1* 12/2022 Lu .................... G06N 3/086
2023/0176652 A1*  6/2023 Youm ................ G06F 3/016
                                              340/407.1

OTHER PUBLICATIONS

Transparent Film-Type Vibrotactile Actuator Array and Its Haptic Rendering Using Beat Phenomenon by Dong-Soo Choi and Sang-Youn Kim in Sensors, 2019, 19(16), 3490, https://doi.org/10.3390/s19163490.

* cited by examiner

WRITING INSTRUMENT AND METHOD

This application claims priority from European patent application No. 22305036.0, filed on Jan. 17, 2022, the contents of which are hereby incorporated herein in their entirety by this reference.

TECHNICAL FIELD

The embodiments described in the following disclosure relate to a haptic writing instrument, and associated methods, a system, and a computer program element.

BACKGROUND

Some options for writing or drawing on a substrate include the use of a pen and permanent ink to write on paper, the use of pencil to write on paper, or the use of a non-permanent ink to write on a whiteboard surface, for example the BIC Velleda™ whiteboard.

Modern consumers are typically becoming more interested in personalised writing products having added functionality. Such products can be personalised to the needs of individual users. Furthermore, writing options enabling reuse of the writing media increases in importance as environmental concerns continue to increase in prominence.

The sensation that a user experiences when writing on a surface is a significant aspect of the writing experience. The sensation typically arises from mechanical displacement of a pen nib as it is traced over a surface having a degree of roughness, such as paper. However, reusable writing tablets typically have a smooth writing surface provided as a plastic or glass tablet. The haptic experience from reusable writing tablets can, therefore, be further improved.

SUMMARY

According to a first aspect, there is provided a computer implemented method for computing a plurality of virtual texture waveform definitions. The method comprises:
  obtaining first texture data at least partially characterising a texture of an existing writing surface;
  obtaining second texture data at least partially characterising an intended texture to be experienced by a user of a haptic writing instrument when writing on the existing writing surface;
  generating virtual texture data by modifying the first texture data based on at least the second texture data;
  segmenting the virtual texture data into at least first and second regions representing, respectively, at least a first texture type and a second texture type;
  generating at least first and second virtual texture waveform definitions corresponding, respectively, to the first and second texture types; and
  outputting at least the first and second virtual texture waveform definitions.

Texture, and the vibrations which it generates, forms a significant part of the experience of writing. However, it is difficult to modify this element of the user experience without technically advanced display-based solutions. Currently, the texture of the surface upon which a writing instrument is moving can interfere with any virtual texture effects applied. A haptic writing instrument simulates the sensation of writing on a surface of a user's choice, whilst writing on an entirely analogue, arbitrary surface. This can be achieved by recourse to an external database of virtual textures, for example.

According to the aspects of the present specification, haptic feedback is provided to the user of a haptic writing instrument when writing on a conventional writing surface. Furthermore, when writing on a reusable writing surface such as a plastic or glass tablet, a texture similar to a conventional paper writing surface can be induced. The writing surface is passive, and thus a power source in an associated writing tablet is not essential, further simplifying a haptic writing solution. A specialised writing tablet is not required, because the haptic writing instrument is deployed on standard surfaces. The texture simulation can be tailored to a specific user, and respond to how the writing instrument is moved across the surface by a user.

According to a second aspect, there is provided a method of using a haptic writing instrument configured to provide tactile feedback to a user. The method comprises:
  obtaining, at a controller of the haptic writing instrument, at least the first and second virtual texture waveform definitions computed according to the method of the first aspect, or its embodiments discussed in this specification;
  detecting a motion of the haptic writing instrument from a first location to a second location of the existing writing surface using at least one motion sensor of the haptic writing instrument;
  generating either a first or a second actuator drive signal using either the first virtual texture waveform definition or the second virtual texture waveform definition, based on the motion detected by the at least one motion sensor; and
  actuating at least one actuator of the haptic writing instrument using either the first or second actuator drive signals, thereby inducing a force against a portion of a user of the haptic writing instrument, enabling the user to feel the intended texture when writing on the existing writing surface when, in use, the haptic writing instrument is translated from a first location to a second location of the existing writing surface.

According to a third aspect, there is provided a haptic writing instrument configured to provide tactile feedback to a user. The haptic writing instrument comprises an elongate body portion enabling a user to grip the haptic writing instrument, wherein the body portion comprises a proximal end and a distal end, the proximal end configured, in use, to contact region of a writing surface, an elongate rigid portion comprised, at least partially, within the elongate body portion, at least one damper configured to attach the elongate rigid portion to the elongate body portion, and at least one actuator configured to displace the elongate rigid portion.

The at least one actuator is configured to vibrate at one or more frequencies, and to transfer the vibrations to the elongate rigid portion. The haptic writing instrument comprises at least one motion sensor configured to detect motion of the haptic writing instrument relative to the writing surface and to output at least one motion signal to the controller, and a controller configured to receive the at least one motion signal. The controller is configured to generate a first or a second actuator drive signal for controlling the at least one actuator based on a combination of the at least one motion signal and either of the first or second virtual texture waveform definitions comprised in a data record accessible to the controller, thereby causing a user of the haptic writing instrument to sense an intended texture caused by the motion of the haptic writing instrument from a first location to a second location of the existing writing surface.

According to a fourth aspect, there is provided a writing system comprising a haptic writing instrument according to the third aspect or its embodiments discussed herein, an external computing device, and a communications network configured to communicably couple the haptic writing instrument and the external computing device. The haptic writing instrument is configured to transmit first texture data characterising a texture of an existing writing surface to the external computing device, and to receive at least first and second virtual texture waveform definitions generated by the external computing device.

According to a fifth aspect, there is provided a computer program element comprising instructions which, when the program is executed by a computer, cause the computer to carry out the method according to the first or fourth aspects.

According to a sixth aspect, there is provided at least one readable media having stored thereon the computer program element according to the fifth aspect.

In brief, a haptic writing instrument can simulate the sensation of writing on a user-defined surface without needing any control over, or modification to, the existing writing surface. The haptic writing instrument comprises means to induce a vibration when it is translated around the existing writing surface. The induced vibration is designed according to techniques discussed herein.

For example, data about the existing writing surface (for example, a measure of its average peak-to trough height variation such as rugosity, or definition of the material of the existing writing surface, or bitmap of the existing writing surface) is combined with user preferences of the texture to be induced. For example, a user can use the haptic writing instrument on a glass tablet surface. A glass tablet surface is smooth and induces few vibrations into the body of the haptic writing instrument. Accordingly, a user can select that the haptic writing instrument induces the sensation associated with writing on paper surface. In an example, the user defined texture can apply different textures based on the location of the haptic writing instrument on a sheet of paper. This can, for example, enable partially sighted or blind users of the haptic writing instrument to fill-in official forms correctly, or to enable able-bodied users of the haptic writing instrument to fill-in official forms in low light conditions, by indicating to the user when the writing instrument is straying outside of a box field intended for filling in data, for example.

Therefore, a method is provided to enable the generation of appropriate waveforms that can be used to generate vibrations that cancel, or modify, the vibrations transferred by an existing writing surface. Thus, a user of a haptic writing instrument experiences a sensation of writing on another surface. In one example, different waveforms correspond to different areas of writing surface.

In an example, the haptic writing instrument can collect data about how the smart pen is being translated on the existing writing surface, analyse the data, and select and modify waveforms as appropriate.

In an example, texture refers to surface characteristics and appearance of a surface defined by the size, shape, density, arrangement, or proportion of its elementary parts. Two different surface textures may each comprise a pattern of peaks and valleys that vary in height, and/or their distance from each other.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

This specification therefore concerns examples of a writing instrument design, which may be a pen, containing actuators which are capable of generating vibrations to produce virtual texture effects, a set of algorithms capable of generating texture specific waveforms to be implemented by the aforementioned actuators (given information about the current and desired writing surfaces), and an algorithm to modify the aforementioned waveforms based on data collected by the pen about how it is moving.

The publication "Transparent Film-Type Vibrotactile Actuator Array and Its Haptic Rendering Using Beat Phenomenon" by Dong-Soo Choi and Sang-Youn Kim in Sensors, 2019, 19(16), 3490, https://doi.org/10.3390/s19163490 discusses texture surface simulation. In particular, it has been shown that the texture of the surface can be simulated by the simultaneous production of two vibrational modes $v_1$ and $v_2$. The difference in frequency between $v_1$ and $v_2$ is small, and precisely tuned. This causes beating, wherein the resultant vibration comprises a carrier wave having a high frequency $$\frac{1}{2}(v_1 + v_2).$$

The carrier wave is modulated by the envelope wave having a lower frequency than the carrier wave:

$$\frac{1}{2}(v_1 - v_2).$$

Such frequencies can be targeted at different mechanoreceptors in human skin, and thus can be used to simulate texture.

Figure 1:
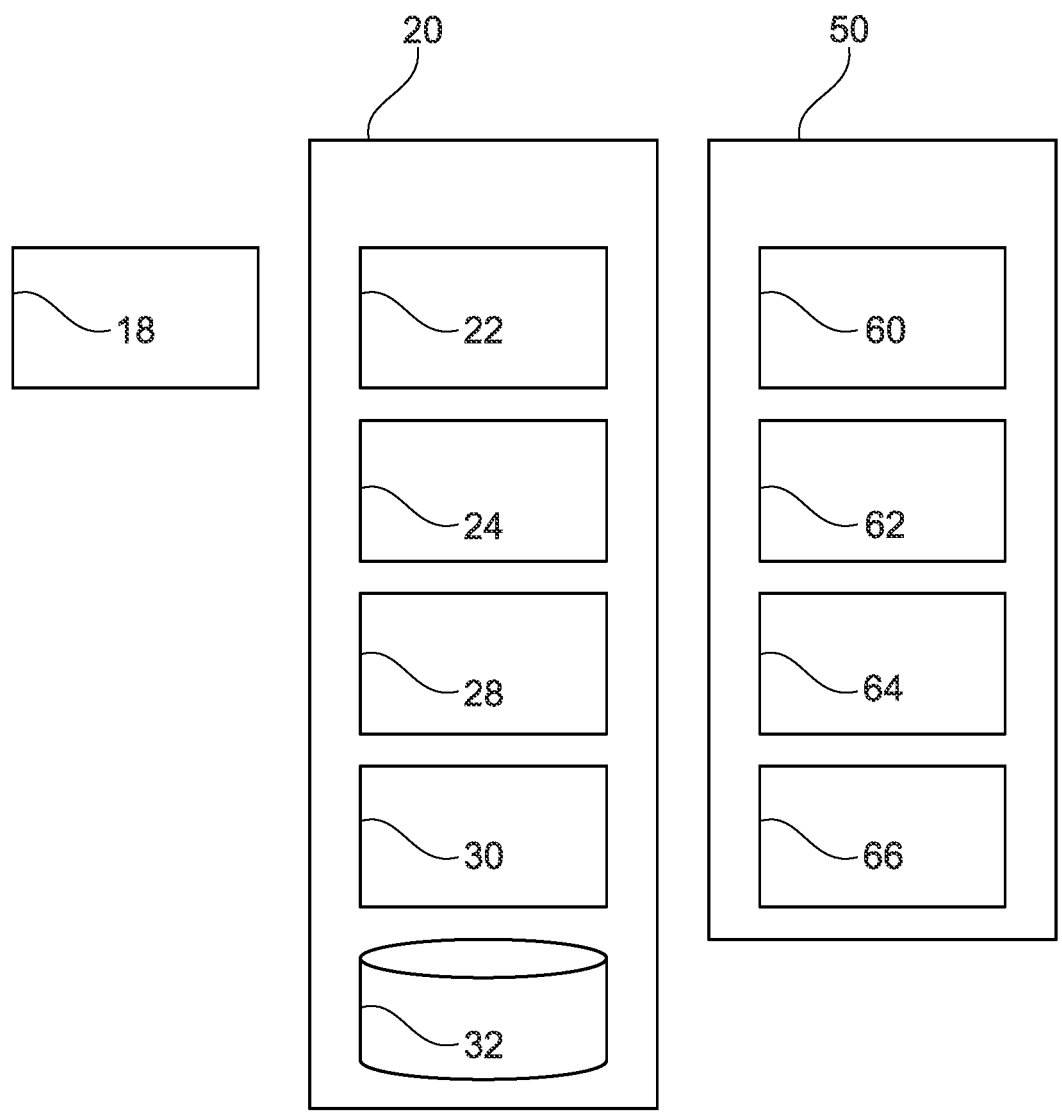
FIG. 1 schematically illustrates a system according to an example of the present technique.

FIG. 1 schematically illustrates a system according to an example of the present technique.

To set the system in context, a waveform generation system 20 generates waves capable of inducing textural sensations in the user of a haptic writing instrument 50. In an example, a texture sensor 18 obtains a description of the texture of an existing surface that a user intends to write on with the haptic writing instrument 50.

The waveform generation system 20 comprises an image combination function 22, a waveform generation function 24, a selection and modulation function 28, a user interface 30, and a texture database 32.

The haptic writing instrument 50 may comprise a motion sensor 60, at least one actuator 62 for inducing vibration in the haptic writing instrument 50, an elongate rigid portion 64 for transferring the induced vibration to a user and at least one damper 66. The function of the aforementioned elements will now be elaborated.

Figure 2:
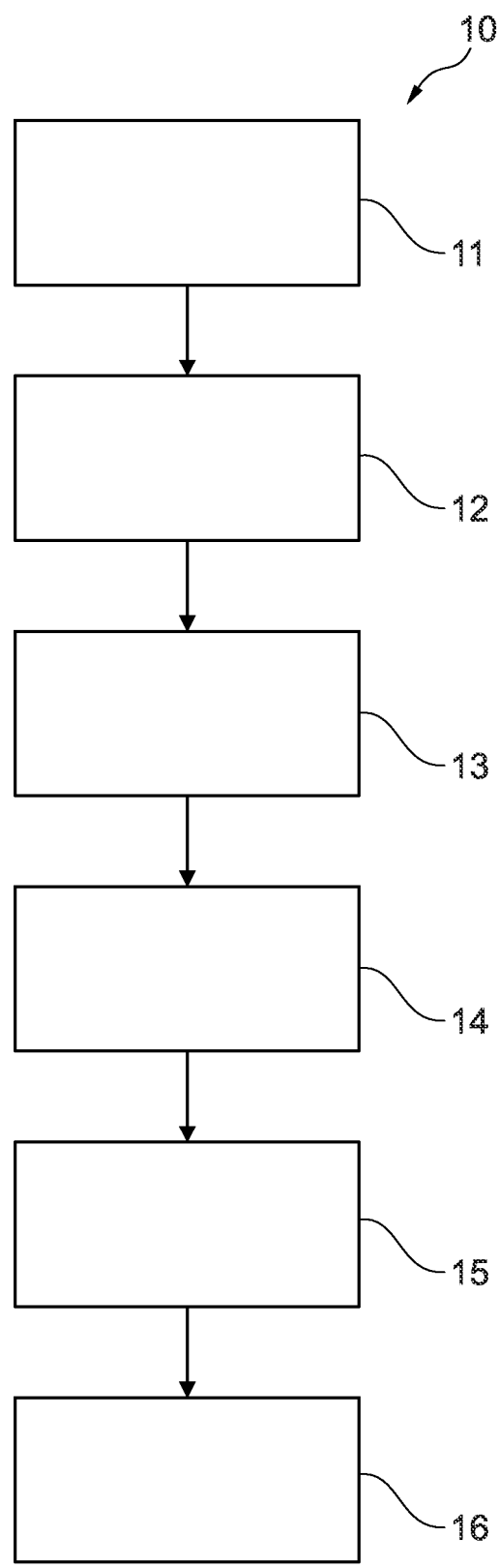
FIG. 2 schematically illustrates a computer implemented method for computing a plurality of virtual texture waveform definitions.

FIG. 2 schematically illustrates a computer implemented method for computing a plurality of virtual texture waveform definitions.

According to the first aspect, there is provided a computer implemented method 10 for computing a plurality of virtual texture waveform definitions. The method comprises:

obtaining 11 first texture data 40 at least partially characterising a texture of an existing writing surface;

obtaining 12 second texture data 42 at least partially characterising an intended texture of a virtual writing surface;

generating 13 virtual texture data 44 by modifying the first texture data based on at least the second texture data;

segmenting 14 the virtual texture data 44 into at least first 47a and second 47b regions representing, respectively, at least a first texture type T1 and a second texture type T2;

generating 15 at least first S1 and second S2 virtual texture waveform definitions corresponding, respectively, to the first and second texture types; and outputting 16 at least the first and second virtual texture waveform definitions.

Accordingly, a method for designing vibration waveforms is provided, dependent on, and responsive to, surface texture properties of an existing writing surface. An actuator, such as an actuator in a haptic writing instrument 50, uses the designed vibration waveforms to provide a user with a modified sensation of texture when using the writing instrument 50 on an existing writing surface.

The computer implemented method comprises, in an example, processing bitmap data that delineates first 47a and second 47b regions of an existing surface having respective texture types T1 and T2. When the writing instrument 50 is in the first region 47a, a signal generating the first texture type T1 may be induced in the writing instrument 50. When the writing instrument 50 is in the second region 47b, a signal generating the second texture type T2 may be induced in the writing instrument 50.

In an example, the signal generating the first texture is a substantially sinusoidal signal defined by $v_{1\ T1}$ and $v_{2\ T1}$. In embodiments, this causes a first form of beating, wherein the resultant vibration comprises a carrier wave having a high frequency $$\frac{1}{2}(v_{1T1} + v_{2T1}).$$

The carrier wave is modulated by the envelope having a lower frequency than the carrier wave:

$$\frac{1}{2}(v_{1T1} - v_{2T1}).$$

In an example, the signal generating the second texture is a substantially sinusoidal defined by $v_{1\ T2}$ and $v_{2\ T2}$. In embodiments, this causes a second form of beating, wherein the resultant vibration comprises a carrier wave having a high frequency $$\frac{1}{2}(v_{1T2} + v_{2T2}).$$

The carrier wave is modulated by the envelope having a lower frequency than the carrier wave:

$$\frac{1}{2}(v_{1T2} - v_{2T2}).$$

In an example, the signal generating the first and/or second textures may be a square wave, a triangle wave, or other more harmonically complex signals. It is not essential that the signals generating the first and second textures are sinusoidal.

According to an example, the at least first and second virtual texture waveform definitions are time domain samples defining the virtual texture when a haptic writing instrument 50 is moved across an existing writing surface. For example, the at least first and second virtual texture waveform definitions comprises time domain representations of sinusoidal signals to be used to actuate at least one actuator 62 comprised in a haptic writing instrument 50.

According to an example, the at least first and second virtual texture waveform definitions are parametric, in other words, storing a reduced summary of the first and second virtual texture waveforms enabling the regeneration of a time domain waveform representing the virtual texture data when the haptic writing instrument 50 is moved across an existing writing surface. In the case of an example of sinusoidal signals for the first and second virtual texture waveforms, an example first virtual texture waveform definition comprises a first set S1 of parameters defining a first carrier frequency $C_1(t)$ and a first envelope frequency $E_1(t)$. An example second virtual texture waveform definition comprises a second set S2 of parameters defining a second carrier frequency $C_2(t)$ and a second envelope frequency $E_2(t)$. Such a parametric representation of the virtual texture waveform definitions enables a large reduction in the total amount of data to be transmitted between, for example, an external computing device 80 and the haptic writing instrument 50 in use.

Although sinusoids have been discussed as an example, the virtual texture waveform definition defines any suitable waveform capable of representing a texture and capable of being captured in the time domain or parametrically defined, such as different types of noise waveform, triangular wave, square wave, chirp signals, signals defined by wavelets, and the like.

Figure 3:
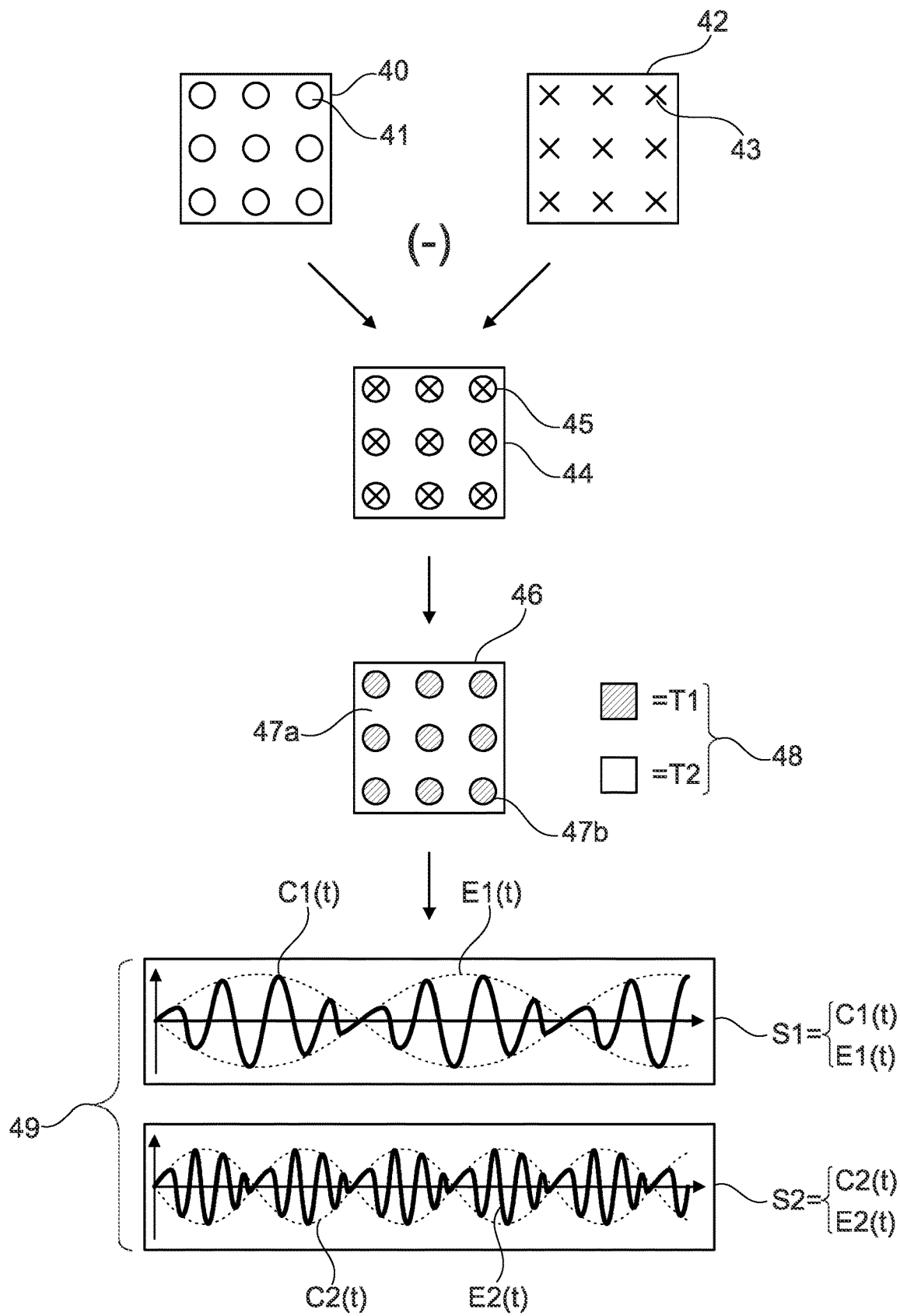
FIG. 3 schematically illustrates an example of the generation of at least first and second virtual texture waveform definitions as exemplary time domain samples.

FIG. 3 schematically illustrates an example of the generation of at least first and second virtual texture waveform definitions as exemplary time domain signals.

In the step of obtaining first texture data 11, the first texture data 40 represents the texture of an existing writing surface. For example, the first texture data 40 may be a bitmap or greyscale image representing an example first texture 41 of the existing writing surface. A variety of methods of defining texture exist. For example, rugosity is a measure of small-scale variations of amplitude in the height of the surface. For example, the first texture data 40 represents the rugosity, or variance of peaks and troughs relative to an average height, of a portion of an existing writing surface. In an example, first texture data 40 may be obtained when a user of an external computing device 80 takes a photograph of the existing writing surface. For example, the user can photograph the existing writing surface using a smart phone. In an example, first texture data 40 is obtained when a user of the haptic writing instrument 50 or external computing device 80 selects a characteristic of the existing surface. For example, the user can select between a "glass" or "paper" option on an input menu hosted by an application of the external computing device 80. The application of the external computing device 80 then designates the first texture data 40 as the user-selected option.

In an example, the first texture data 40 and the second texture data 42 may be represented by a bitmap image of the existing writing surface or the virtual writing surface, respectively.

The data format of the texture representation of the first 40 and second 42 texture data is, in embodiments, selected from one of the following formats: JPG, PNG, TGA, TIF, or BMP (bitmap). For example, the pixel value of a bitmap image represents a positive or negative height deviation of an existing writing surface, with the location of the positive or negative height deviation in the bitmap image registered to a corresponding on an existing writing surface.

In an embodiment, a portion or all of the first and/or second texture data is represented by a signal generator function.

For example, the second texture data 42 may be defined by a one-dimensional signal comprising a periodic positive displacement, wherein the periodic positive displacement occupies less than 10% of the total period when the haptic writing instrument 50 is moved from the top to the bottom of an existing writing surface. Such a one-dimensional signal would have the effect of imposing on the existing writing surface an example second texture 43 corresponding to lined writing paper, which can assist, for example, partially sighted or blind users of the haptic writing instrument 50. Generator functions defining a wood grain texture, different grades of surface roughness corresponding to paper or cardboard and the like.

A user of the haptic writing instrument 50 can use the haptic writing instrument 50 to obtain a texture characteristic of the existing writing surface. For example, the user can configure the haptic writing instrument 50 into a surface texture acquisition mode, either by a switch or tap interface method of the haptic writing instrument 50 itself, or using an input menu option on an application hosted by the external computing device 80. When prompted, the user places the proximal end P of the haptic writing instrument 50 into mechanical contact with the existing writing surface, and traces the proximal end of the haptic writing instrument 50 across the existing writing surface. According to this embodiment, at least one actuator 62 of the haptic writing instrument 50 is configured to detect a displacement of the elongate rigid portion 64 when mechanical vibrations are transferred from the surface of the existing writing surface to the proximal end P of the haptic writing instrument 50.

For example, the at least one actuator 62 piezoelectric actuator may be capable of generating a voltage in response to mechanical stimulus. Acquisition circuitry in the controller 65 of the haptic writing instrument 50 (such as an analogue to digital converter) samples the vibrations sensed by the at least one actuator 62. In one embodiment, the controller 65 stores a time series of samples and is able to reconstruct an impression of the existing writing surface that characterises the surface texture of the existing writing surface.

When obtaining the first texture data 40 using the haptic writing instrument 50, a user follows instructions provided by a graphical user interface of the external computing device 80.

In step 12 of obtaining second texture data 42, second texture data 42 represents an intended texture to be experienced by a user of a haptic writing instrument 50 when writing on an existing writing surface as defined by the first texture data 40. In other words, the second texture data 42 represents an apparent texture, or a virtual texture. For example, the second texture data 42 may be a bitmap or greyscale image representing of the intended texture. In an example, the second texture data 42 is downloaded from a texture image database 32 hosted on a remote server or cloud service via the Internet. In an example, the second texture data 42 may be obtained from a file stored in a native memory of a haptic writing instrument 50. In an example, the second texture data 42 may be obtained from a file stored in an external computing device 80. In an example, the second texture data 42 may be a mathematical generator function capable of generating a texture waveform, rather than a sampled waveform.

In step 13 of generating virtual texture data, an image combination algorithm generates the virtual texture data 44 using the first texture data 40 and the second texture of data 42, as a composite (composite image) of the first texture data 40 and the second texture data 42. The image combination algorithm may, for example, convert a RGB (obtained, for example, from a smart phone camera image of the existing writing surface) into a binary image. In a first example, the algorithm is configured to convert the image of the existing writing surface to first texture data describing height variation in the existing writing surface. In a further example, the algorithm is configured to recognise the writing surface, to download texture specific images from a texture image database 122.

In an example, generating virtual texture data 44 by modifying the first texture data based on at least the second texture data comprises subtracting the first texture data from the second texture data.

In an example, generating virtual texture data 44 by modifying the first texture data 40 based on at least the second texture data 42 comprises inverting the first texture data and adding the inverted first texture data to the second texture data.

Therefore, the image combination algorithm generates a composite image to encode spatially-resolved information about the virtual texture data 44 using the inverse of first texture data 40 defining the existing writing surface. This is implemented, for example, by inverting the image corresponding to the existing writing surface and performing a per pixel Boolean addition of the result of the inversion with the bitmap image corresponding to the second texture data 42. The rationale for this is that the first texture data 40 and the second texture data 42 encode spatially-resolved texture information about respective surfaces. There exists a mapping between the first texture data 40 and the second texture data 42 and the vibrational waveforms that simulate touching the existing writing surface.

The virtual texture data 44 includes the hypothetical surface as a per pixel multiplication of the intended texture to be experienced by user multiplied by the corresponding inverted pixels of the existing writing surface. The vibration corresponding to the virtual texture data 44 under that mapping is such that the superposition of the virtual texture data 44 with the mechanical response generated by mechanically displacing the haptic writing instrument 50 over the existing writing surface corresponding to the sensation of writing implement moving over the intended texture defined by the second texture data 42.

The waveform generation algorithm generates the texture waveforms by mapping regions of the virtual texture data 44 into the frequency domain. An example technique for achieving this as discussed, for example, in the publication "Transparent Film-Type Vibrotactile Actuator Array and Its Haptic Rendering Using Beat Phenomenon" by Dong-Soo Choi and Sang-Youn Kim in Sensors, 2019, 19(16), 3490, https://doi.org/10.3390/s19163490, incorporated herein by reference.

In an example, segmenting 14 the virtual texture data into at least a first region and a second region comprises performing edge detection on the virtual texture data to identify at least first 47a and second 47b regions of the virtual texture data characterised by at least first and second respective spatial frequencies falling within corresponding first and second frequency ranges, and labelling the at least first 47a and second 47b regions of the virtual texture data as at least first and second texture segments, respectively.

Therefore, the virtual texture data 44 is segmented into equivalence classes of similar textures representing a first texture type T1 and at least a second texture type T2. T1 and T2 are alternatively referred to as texture segments. Image segmentation approaches known to a person skilled in the art may be used to distinguish at least the first texture type T1 and at least a second texture type T2, for example. FIG. 3 illustrates the segmented virtual texture data 44 as region 46, comprising the first texture type 47b and the second texture type 47a. The total number of text types in a given set of virtual texture data after segmentation is comprised in the texture set 48.

In an example, generating at least first S1 and second S2 virtual texture waveform definitions corresponding, respectively, to the first T1 and second T2 texture types further comprises generating the first virtual texture waveform definition comprising a first beat frequency and a first carrier frequency based on the first texture type, and generating the second virtual texture waveform definition comprising a second beat frequency and a second carrier frequency based on the second texture type.

In an embodiment, the generation 15 of at least first S1 and second S2 texture waveforms comprises generating beat frequencies and carrier frequencies corresponding to the texture information encoded in the texture segments. For example, generating at least first S1 and second S2 texture waveforms comprises extracting pairs of approximately equal frequencies capable of giving rise to beating effects. In the exemplary case of texture waveforms generated by sinusoids, a first texture waveform S1 is defined by a carrier frequency $C_1(t)$ an envelope frequency $E_1(t)$. The second texture waveform S2 is defined by a carrier frequency $C_2(t)$ and an envelope frequency $E_1(t)$. In an example, the first and second texture waveforms may be stored as a set of virtual texture waveform definitions.

In an example, the set of virtual texture waveform definitions comprises a data structure storing time domain samples of the first and second texture waveforms. In an example, the set of virtual texture waveform definitions may comprise a data structure storing a parametric definition of the first and second texture waveform.

In an example, the first texture waveform S1, when provided as a first drive signal of an actuator of a haptic writing instrument 50 when provided as a drive signal of an actuator of a haptic writing instrument, is capable of inducing a beating effect in the haptic writing instrument at a first frequency. The second texture waveform S2 when provided as a second drive signal of an actuator of a haptic writing instrument, is capable of inducing a beating effect in the haptic writing instrument at a second frequency.

Outputting 16 the at least first and second virtual texture waveform definitions comprises several options. If computed on an external computing device 80 such as a smart phone, the virtual texture waveform definitions are stored in a volatile memory 85 of the external computing device 80 until transmitted to the haptic writing instrument 50. The external computing device 80 stores the virtual texture waveform definitions in its non-volatile memory 89, enabling a user to recall the set of virtual texture waveform definitions at a subsequent time, for example, via a user display 87. According to an example, the external computing device 80 transfers the virtual texture waveform definitions to an external computer system comprising a networked database 96 and/or a texture database 122.

In an example, there is provided obtaining at least one of the first texture data 40 or the second texture data 42 via a data transmission from a texture sensor comprised in a haptic writing instrument, or obtaining at least one of the first texture data or the second texture data via one or more user-provided digital images.

In an example, there is provided obtaining at least one of the first texture data 40 or the second texture data 42 via a user interface of a software application.

In an example, there is provided obtaining, via a remote texture database, at least first S1 or second S2 virtual texture waveform definitions based on the first 40 or second 42 texture data, respectively.

Figure 4:
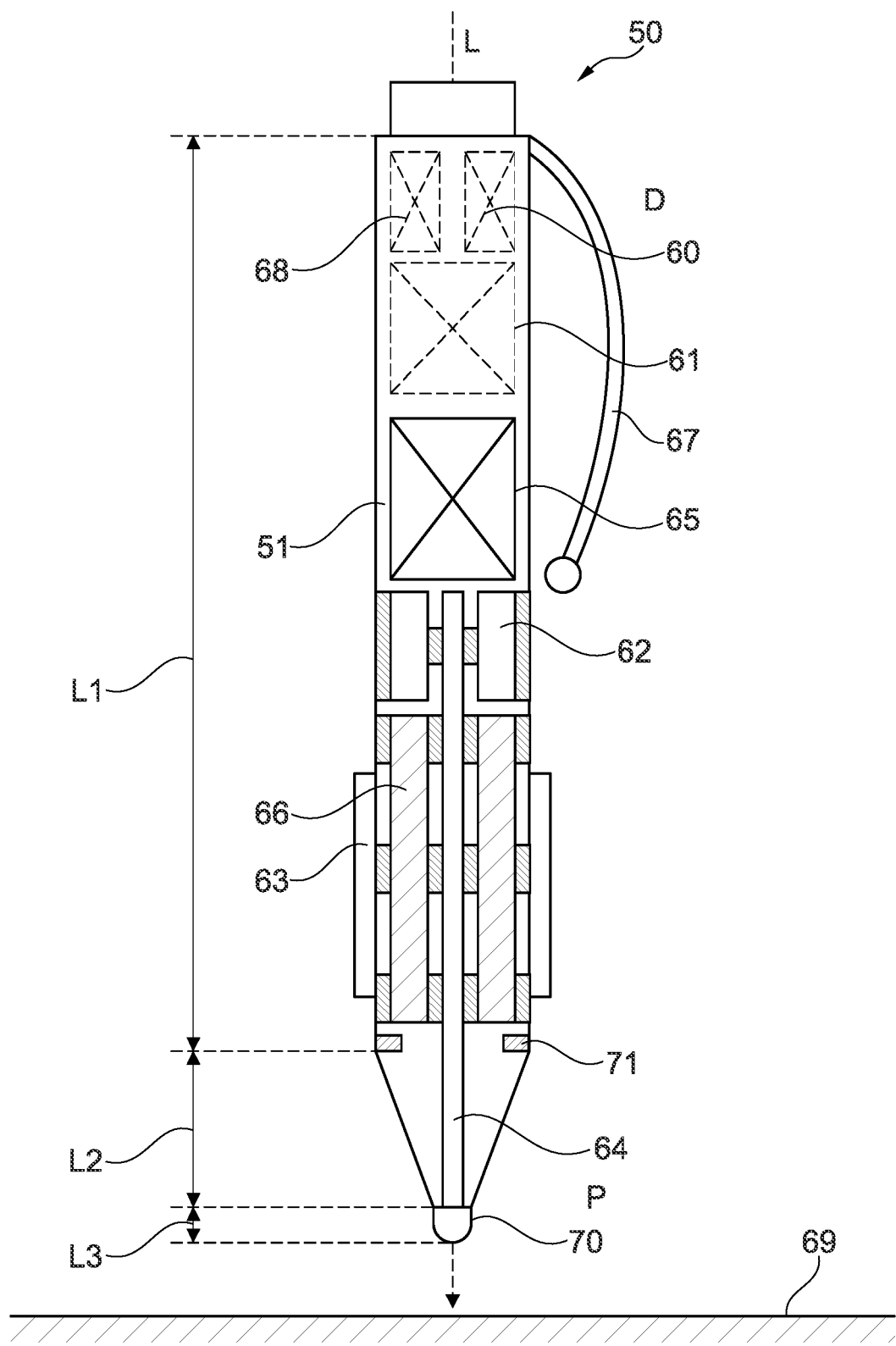
FIG. 4 schematically illustrates a longitudinal cross-sectional view of an example of a haptic writing instrument.

FIG. 4 schematically illustrates a longitudinal cross-sectional view of a haptic writing instrument according to the third aspect.

According to a third aspect, there is provided a haptic writing instrument 50 configured to provide tactile feedback to a user.

The haptic writing instrument comprises an elongate body portion 51 enabling a user to grip the haptic writing instrument. The body portion comprises a proximal end P and a distal end D. The proximal end is configured, in use, to contact region of a writing surface. The haptic writing instrument 50 further comprises an elongate rigid portion 64 comprised, at least partially, within the elongate body portion, at least one damper 66 configured to attach the elongate rigid portion to the elongate body portion, and at least one actuator 62.

The at least one actuator 62 may be configured to displace the elongate rigid portion, wherein the at least one actuator may be configured to vibrate at one or more frequencies, and to transfer the vibrations to the elongate rigid portion.

The haptic writing instrument 50 further comprises at least one motion sensor 60 configured to detect motion of the haptic writing instrument relative to the writing surface and to output at least one motion signal to the controller, and a controller 65.

The controller 65 is configured to receive the at least one motion signal, and to generate a first or a second actuator drive signal for controlling the at least one actuator based on a combination of the at least one motion signal and either of the first S1 or second S2 virtual texture waveform definitions comprised in a data record accessible to the controller, thereby causing a user of the haptic writing instrument to feel an intended texture via the motion of the haptic writing instrument when the haptic writing instrument is translated from a first location to a second location of the existing writing.

In an example, the elongate rigid portion is configured to resonate at one or more frequencies corresponding to the one or more frequencies at which the actuators are configured to vibrate.

For example, the haptic writing instrument 50 may comprise an elongate body portion 51 divided into a tubular section of constant diameter L1, a tapering body portion L2, and a tip portion L3 at the proximal end P. In an example, the tip section 70 comprises an ink nib, or a hardened stylus tip. In an example, the elongate body portion 51 may comprise a clip 67. Typically included within the elongate body portion 51 are, for example, an electrical power source 61 capable of providing electrical energy to all electrical elements within the haptic writing instrument 50.

In an example, the haptic writing instrument 50 has a circular, ovular, square, rectangular, pentagonal, hexagonal, or heptagonal cross-section along at least a segment. The haptic writing instrument 50, for example, illustrated as an elongated object aligned along a longitudinal axis L, but this is not essential.

The form-factor of the elongate body 51 can change along the longitudinal axis L of the haptic writing instrument 50 to accommodate ergonomic variations or to enhance user comfort, for example (not illustrated).

In an example, the total length of the haptic writing instrument 50 in the longitudinal direction L may be between 50 mm and 200 mm, and specifically 140 mm. In an example, when the haptic writing instrument 50 has a circular cross-section, the maximum diameter of the haptic writing instrument 50 is in the range of 6 mm to 20 mm, and specifically 9 mm. The elongate body 51 of the haptic writing instrument 50 can, for example, comprise injection moulded from polystyrene or polypropylene.

In the illustrated example, the external surface of the haptic writing instrument 50 comprises, near to its distal end, a clip 67 for facilitating attachment to a user's pocket, for example. The haptic writing instrument 50 may comprise, near to the proximal end P, a user grip 63 comprised of a resilient material such as rubber. The user grip 63 can be moulded to achieve an ergonomic match with a typical user profile, to enhance writing comfort.

The haptic writing instrument 50 comprises an elongate rigid portion 64 which extends at least partially along the longitudinal direction L of the haptic writing instrument 50. During use, the elongate rigid portion 64 is in vibrational contact with the surface that generates the texture of the existing writing surface (first texture data). The elongate rigid portion is thus capable of transmitting vibrations induced by changing texture on the existing writing surface to one or more actuators placed along the length of the elongate rigid portion 64. In an example, the elongate rigid portion 64 rod is made of polycarbonate, or a metal such as steel. In an example, the elongate rigid portion 64 encloses a void (not illustrated) for storing an ink cartridge that is in fluid communication with a nib (not illustrated) at the proximal end P of the haptic writing instrument 50. In use, as the haptic writing instrument 50 is traced over an existing writing surface, vibrations induced in the tip 70 are transmitted along the length of the elongate rigid portion 64 to at least one actuator 62.

The haptic writing instrument 50 comprises a damper 66 that is functionally connected between the elongate rigid portion 64 and the elongate body portion 51. FIG. 4 illustrates a cross-section schematic view of the haptic writing instrument 50 showing two halves of a damper 66. In one embodiment, the damper 66 is formed from a resilient material having a tubular form, such as a rubber or foam sleeve elongate rigid portion 64. In embodiments, the damper 66 may be formed from a plurality of pieces of resilient material disposed along the length of the elongate body portion. In one embodiment, the damper 66 is a non-permeable plastic sleeve filled with a liquid or gel material. In one embodiment, the damper 66 may comprise opposed magnets on respective sides of the elongate rigid portion 64 and the elongate body portion 51.

The function of the damper 66 in combination with the elongate rigid portion 64 is to reduce relative motion between the rigid elongated body portion 51 and the elongate rigid portion 64 across a predefined frequency range, or across all frequencies. The damper 66 is constructed so as to admit relative motion between the elongate rigid portion 64 and the rigid elongated body portion 51 caused by textures on existing writing surface between the elongate rigid portion 64 and the elongate body portion 51. The damper 66 is, for example, configured to damp at least one resonant frequency of the elongate rigid portion 64, the elongated body portion 51, or any other component of the haptic writing instrument 50. In an example, the damper 66 is configured to provide broadband damping of vibrations caused by the motion of the haptic writing instrument 50 over a texture of the existing writing surface.

The haptic writing instrument 50 may further comprise at least one actuator 61a configured to displace the elongate rigid portion 64.

In an example, the at least one actuator 61a is configured to generate vibrations at least at two distinct frequencies, so that a beating effect is induced in the elongate rigid pen core 64. In an example, the at least one actuator is configured to dynamically vary the output vibration based on at least one waveform texture definition. In variations, the at least one actuator comprises a magnetic actuator, or an actuator based on a loudspeaker diaphragm, for example. In some embodiments, a surface contact sensor 71, such as a pressure sensor, is provided, for example at the proximal end P of the haptic writing instrument 50. The surface contact sensor 71 is configured to activate a texture simulation function of the haptic writing instrument 50, for example.

According to an embodiment, the at least one actuator 60 may comprise a piezoelectric actuator, or a piezoelectric array of two piezoelectric elements in vibrational contact with the elongate rigid portion. According to an embodiment, the at least one actuator is configured to produce vibrations in the range 1 Hz to 1000 Hz. In an example, the haptic writing instrument comprises two piezoelectric elements in vibrational contact with the elongate rigid portion 64.

According to an embodiment, the at least one motion sensor 60 comprises at least one item selected from the group of a MEMS accelerometer, an optical motion sensor, or feedback from a piezoelectric sensor mounted in-between the elongate body portion and the elongate rigid portion. For example, the at least one motion sensor 60 is configured to monitor aspects of the motion of the haptic writing instrument 50, feedback the detected motion to the controller 65. The at least one motion sensor 60 is configured to detect at least one, or a combination, of the acceleration and/or velocity of the haptic writing instrument, or information about the texture of the existing surface.

In an example, the controller 65 may be communicably coupled to a memory element (not illustrated) of the haptic writing instrument 50. The memory element can comprise a plurality of stored control signals for generating a respective plurality of virtual texture signals. In an example, the controller 65 is a microcontroller such as a Microchip "PIC"™, an ARM™ processor, or a Field Programmable Gate Array (FPGA). The controller 65 is configured to actuate the at least one actuator 62 to generate a virtual texture when the haptic writing instrument 50 is traced over an existing writing surface, based on a virtual texture waveform definition and at least one motion sensor 60.

In an example, the haptic writing instrument 50 may comprise a vibration sensor (not illustrated) capable of recording vibrations from an existing writing surface as the haptic writing instrument 50 is traced over it. In an example, the at least one actuator 62 functions bidirectionally, so that vibrations transmitted to the at least one actuator 62 via the elongate rigid portion 64 can be detected using an analogue to digital converter configured to read a voltage induced by the at least one actuator 62. Piezoelectric elements, for example, are an example of a bidirectional actuator capable of both detecting a vibration (when a voltage across the terminals of a piezoelectric element is measured), and generating a vibration (when a voltage is applied across the terminals of the piezoelectric element).

In another example, a separate vibration sensor is provided. In some cases, a vibration detected as the haptic writing instrument 50 is traced over an existing surface is sampled by the controller 65, and stored for further use, or transmitted to an external computing device 80 via the communication interface 68.

In an example, the tip of the haptic writing instrument further comprises an optical displacement sensor capable of resolving a relative displacement of the haptic writing instrument on the existing writing surface. In this example, the optical displacement sensor functions as the motion sensor 60, and transmits relative motion data to the controller 65.

In an example, the power source 61 is an alkaline battery (such as a AAA or an AA battery), a lithium battery, a Li-ion battery, and the like. The battery can be embedded in the writing instrument, and either be disposable or rechargeable.

In an example, the communication interface 68 may be a wireless communication interface such as a WiFi™, Bluetooth™, Bluetooth Low Energy™, RFID, or Near Field Communication interface. In an example, the communication interface 68 may be an infra-red communication interface. The communication interface 68 is configured to facilitate communication between the haptic writing instrument 50 and relevant third party devices, such as an external computing device 80. In an example, the external computing device 80 is a smartphone of a user of the haptic writing instrument 50, or another device such as a laptop, tablet computer, desktop computer, or a smartwatch.

According to a second aspect, there is provided a method 100 of using a haptic writing instrument configured to provide tactile feedback to a user. The method comprises:

obtaining 102, at a controller of the haptic writing instrument 50, at least the first and second virtual texture waveform definitions computed according to the method of the first aspect or its embodiments;

detecting 104 a motion of the haptic writing instrument from a first location to a second location of the existing writing surface using at least one motion sensor of the haptic writing instrument;

generating 106 either a first or a second actuator drive signal using either the first virtual texture waveform definition or the second virtual texture waveform definition, based on the motion detected by the at least one motion sensor; and actuating 108 at least one actuator of the haptic writing instrument using either the first or second actuator drive signals, thereby inducing a force against a portion of a user of the haptic writing instrument, enabling the user to sense the intended texture of the virtual writing surface when, in use, the haptic writing instrument is translated from a first location to a second location of the existing writing surface.

Prior to use, a user initializes the haptic writing instrument, for example via an "on button" on the surface of the elongated rigid body 51 (not illustrated). In an embodiment, a user configures the haptic writing instrument 50 into a texture collection mode prior to writing, to record the texture of an existing surface, or of an intended surface on an example of an intended surface.

The user configures the haptic writing instrument 50 to generate a particular type of intended surface texture, either by selecting an intended texture via a control interface on the body of the haptic writing instrument 50, or by configuring the haptic writing instrument via a remote application operated by an external computing device 80. In an example, the user uses remote application to pre-define the existing surface texture. In an example, the user sets the haptic writing instrument into a data acquisition mode and trace the tip of the haptic writing instrument over the existing surface to thus record the existing surface texture as the first texture data. In an example, the remote application specifies or visually demonstrates to the user a preferred sampling pattern or shape to be traced on the existing surface to enable enhanced sampling of the existing surface texture.

The haptic writing instrument then obtains first and second virtual texture waveform definitions corresponding to first and second texture types to be applied to the existing writing surface to generate an intended texture. In an embodiment, the first and second virtual texture waveform definitions are computed by an external computer system 80 and downloaded to the haptic writing instrument. In an embodiment, the first and second virtual texture waveform definitions are computed by the haptic writing instrument. In an embodiment, the first and second virtual texture waveform definitions are precomputed by the haptic writing instrument and stored in a memory of the haptic writing instrument. In an embodiment, the first and second virtual texture waveform definitions are precomputed by an external computing system 80 and downloaded to the haptic writing instrument.

When beginning to write, a user grips the haptic writing instrument 50 and writes on an existing writing surface. The haptic writing instrument 50 is configured to produce vibrations that are transmitted to the hand of a user to generate the sensation of writing on a selected, different surface defined by the second texture data 42 that at least partially characterises an intended texture to be experienced by a user of a haptic writing instrument when writing on the existing writing surface. The user traces the tip 70 of the haptic writing instrument 50 across the surface of an existing writing surface, and experience the intended texture.

When the user has finished writing on the existing writing surface, the haptic writing instrument is turned off by the user. In embodiments, the controller 65 of the haptic writing instrument may detect, for example via the at least one motion sensor 60, a period of inactivity (such as one minute or thirty seconds) and place the haptic writing instrument into a low power mode, or a sleep mode.

For example, the method 100 according to the second aspect applies a selection and modulation algorithm to determine which texture waveform definition to use to generate a waveform to generate using the actuator array. The selection and modulation algorithm may be an online algorithm that takes as input at least two virtual texture waveform definitions, and at least a current position of the tip of the haptic writing instrument on an existing surface. The selection and modulation algorithm computes appropriate first and second actuator drive signals based on the input to the selection and modulation algorithm.

In an example, the selection and modulation algorithm uses pen motion data obtained using at least one motion sensor 60 of the haptic writing instrument to calculate the velocity, and/or the position of the writing instrument on the existing writing surface, for example by inertial dead-reckoning algorithms.

In another example, a camera of an external computing system 80 (such as a Webcam or a camera of a smartphone) may be positioned with a field of view overlooking the existing writing surface. The external computing system 80 is configured to perform online feature extraction of a user of the haptic writing instrument as it moves across the existing writing surface in order to locate the tip 70 of the haptic writing instrument 50 on the existing writing surface. Based on the localization, the external computing system assigns the tip of the haptic writing instrument 50 either to at least first 47a or second 47b texture regions of the virtual texture data 44.

In another example, the external computing system 80 and/or haptic writing instrument establishes a position feedback channel via a wireless interface of a tablet computing device that serves as the existing writing surface. The tablet computing device detects the position of the tip of the haptic writing instrument 50 on the existing writing surface of the tablet using, for example, capacitive touch sensing via the tablet computer screen. Then, the tablet computer updates either the external computing system 80 and/or the haptic writing instrument 50 with the detected position of the tip 70. Based on the detected tip position on the tablet surface, the external computing system assigns the tip of the haptic writing instrument 50 either to at least first 47a or second 47b texture regions of the virtual texture data 44. In some cases, the external computing device 80 may be the tablet performing the location detection.

The selection and modulation algorithm uses this data to modulate the frequencies of the texture waveforms to account, for example, for Doppler shift induced by variations in the rate at which the tip 70 of the haptic writing instrument is traced over the existing writing surface. In some cases, the selection and modulation algorithm predicts the direction that the tip is moving towards, and precompute one or more actuator drive signals from one or more virtual texture waveform definitions, to improve the latency between the tip 70 of the haptic writing instrument 50 from arriving at a region of the existing writing surface, and the intended texture being experienced by a user.

The selection and modulation algorithm may be configured, for example, to determine, from at least one of the sensed position, velocity, or acceleration information of the haptic writing instrument 50, which of the at least first 47a and second 47b texture regions the tip 70 of the haptic writing instrument 50 is in contact with. The selection and modulation algorithm is configured to select one of first S1 and second S2 virtual texture waveform definitions based on the determination of which of the at least first 47a and second 47b texture regions the tip 70 of the haptic writing instrument 50 is in contact with.

An embodiment of the second aspect comprises inferring a location of the haptic writing instrument upon an existing writing surface using the motion detected by the at least one motion sensor of the haptic writing instrument;
referencing the inferred location of the haptic writing instrument to a region 47a comprised in a plurality of regions 47b represented by the at least first and second virtual texture waveform definitions; and
generating either the first or the second actuator drive signal based on the texture segment referenced to the inferred location of the haptic writing instrument.

For example, either the controller 65 or a processor 81 of an external computing device 80 tracks the live position of the tip of the haptic writing instrument on the existing surface. Either the controller 65 or a processor 81 of the external computing system updates a corresponding virtual map of an intended writing surface, wherein the coordinates of the existing writing surface are registered to the coordinates of the intended writing surface. The virtual map of the intended writing surface is also registered to the virtual texture data 44, such that at a selected point in time, when the position of the tip of the haptic writing instrument on the existing surface has been resolved, the controller 65 or a processor 81 of the external computing system detects whether the tip is located in a region of the virtual intended writing surface defined by the first texture type T1 or the second texture type T2. The controller 65 or a processor 81 of the external computing system generates a first or the second actuator drive signal based on the texture segment referenced to the inferred location of the haptic writing instrument, using the first and second virtual texture waveform definitions.

In an example, the controller 65 or a processor 81 of the external computing system executes in real-time, thus sampling the existing writing surface and generating first or second actuator drive signals continuously.

In an example, the controller 65 or the processor 81 of the external computing system executes at predefined time intervals, such as every one, five or ten seconds.

In an example, the controller 65 or a processor 81 of the external computing system execute when a change in the signal from the at least one motion sensor 60 indicates that an update of the first or second actuator drive signals is required, for example because the tip 70 of the haptic writing instrument has changed between texture regions.

An embodiment of the second aspect comprises detecting a displacement of the haptic writing instrument 50 from a first location to a second location of the existing writing surface using the at least one motion sensor of the haptic writing instrument; and
modifying at least the first S1 and second S2 virtual texture waveform definitions to compensate for a change in an apparent texture caused by the haptic writing instrument moving between the first and second locations.

In an example, the motion sensor 60 determines the velocity and/or acceleration of the tip of the haptic writing instrument, and scale the virtual texture waveform definitions at the first 47a and second 47b regions representing, respectively, at least a first texture type T1 and a second texture type T2, to compensate for Doppler, for example.

Figure 5:
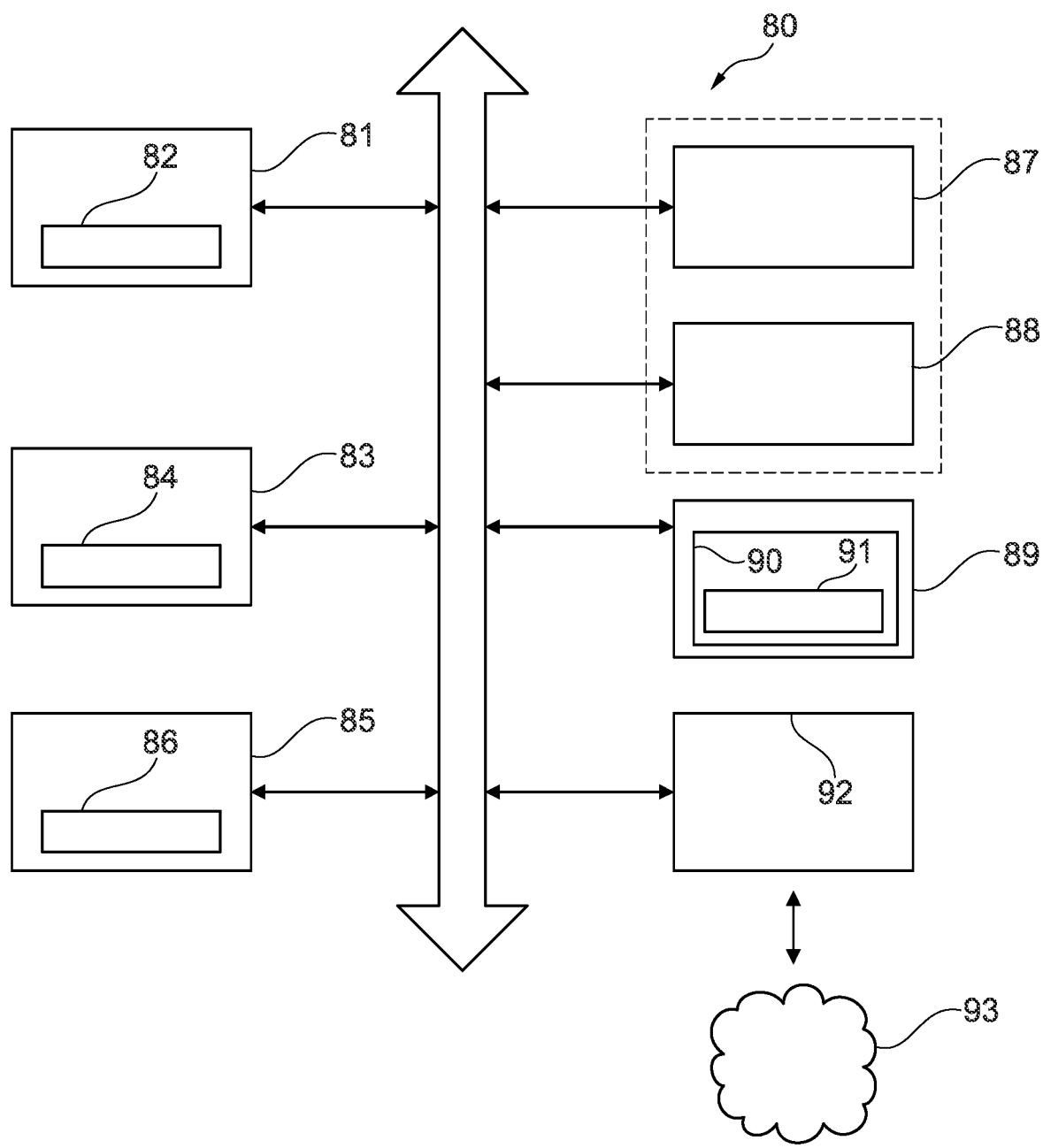
FIG. 5 schematically illustrates functional elements of an external computing device.

FIG. 5 schematically illustrates functional elements of an external computing device.

In an example, the external computing device 80 may comprise a processor 81 capable of executing machine readable instructions 82 that instrument an operating application of either a method 10 for computing a plurality of virtual texture waveform definitions, and/or a method 100 of using a haptic writing instrument configured to provide tactile feedback to a user, as defined herein.

The external computer system 80 may comprise a main memory such as Random Access Memory (RAM) capable of storing the machine readable instructions during operation, as well as first and second virtual texture waveform definitions. The external computing device 80 may comprise a non-volatile memory 89 capable of durably storing software 91 comprising machine readable instructions capable of executing machine readable instructions 82 that implement an operating application of either a method 10 for computing a plurality of virtual texture waveform definitions, and/or a method 100 of using a haptic writing instrument configured to provide tactile feedback to a user, as defined herein.

In an example, the external computing device 80 may further comprise a user display 87 and a user input device 88 (sometimes combined as a touch screen or a tablet screen). The external computing device 80 is configured to host a user application. For example, the user application is configured to enable a user, via the user display 87 to choose one out of a library of virtual texture waveform definitions, for example, and to configure functions of the haptic writing instrument 50. The user display facilitates data input from a user, enabling a selection to be made concerning an existing writing surface, the intended writing texture, pre-sets of the amplitude of the writing system, and any other relevant data.

The external computing device may further comprise a communications interface 92 comprising at least one of a WiFi™, Bluetooth™, Bluetooth Low Energy (BLE)™, RFID, or NFC communications interface for communication with a haptic writing instrument as discussed herein. In examples, the communications interface 92 is configured to communicate with a server, or cloud service 93, via a Local Area Network or Wide Area Network, for example for the purpose of downloading software updates, patches, or updating user accounts. In an example, the external computing device 80 is a smartphone, a tablet computer, a laptop, or a desktop computer, for example.

Figure 6:
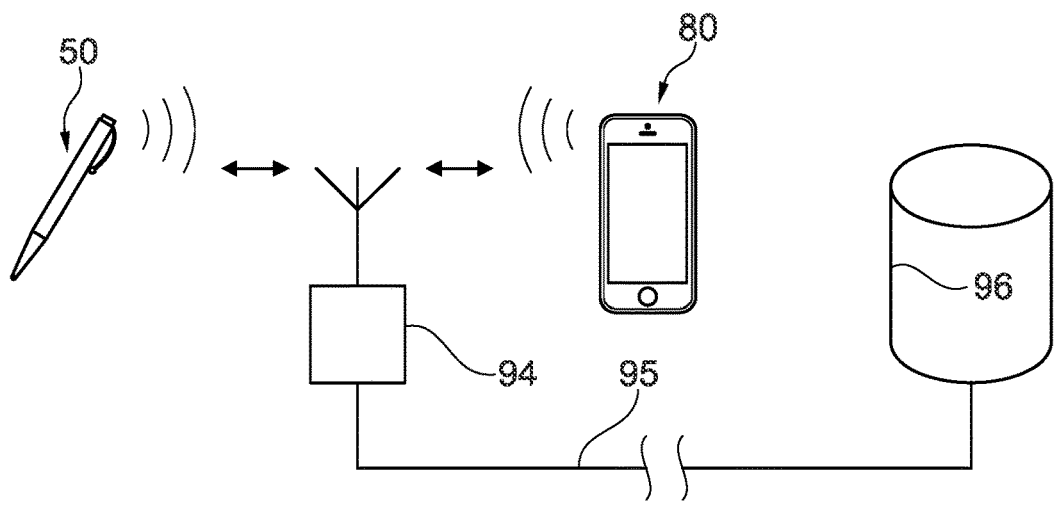
FIG. 6 schematically illustrates an example of a writing system comprising a haptic writing instrument.

FIG. 6 schematically illustrates an example of a writing system comprising a haptic writing instrument.

For example, the haptic writing instrument 50 communicates via WiFi™, Bluetooth™, RFID, NFC, or other wireless communication modalities with a wireless communications network 94. The wireless communications network communicably interfaces, in turn, with a networked database comprising stored samples of second texture data (defining, for example, an intended surface). The external computing device 80 is communicably coupled to the wireless communications network 94, enabling networked control of the features of the haptic writing instrument 50. In an example, the computation of the virtual texture waveform definitions is transferred from the haptic writing instrument 50 to the external computing device 80 and/or a cloud computing service, to enable a faster computation of appropriate virtual texture waveform definitions.

Figure 7:
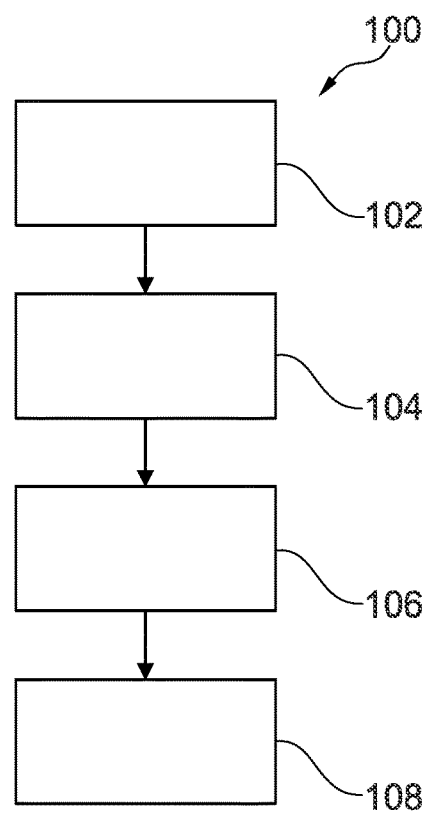
FIG. 7 schematically illustrates an example of a method of using a haptic writing instrument.

FIG. 7 schematically illustrates an example of a method 100 of using a haptic writing instrument.

Figure 8:
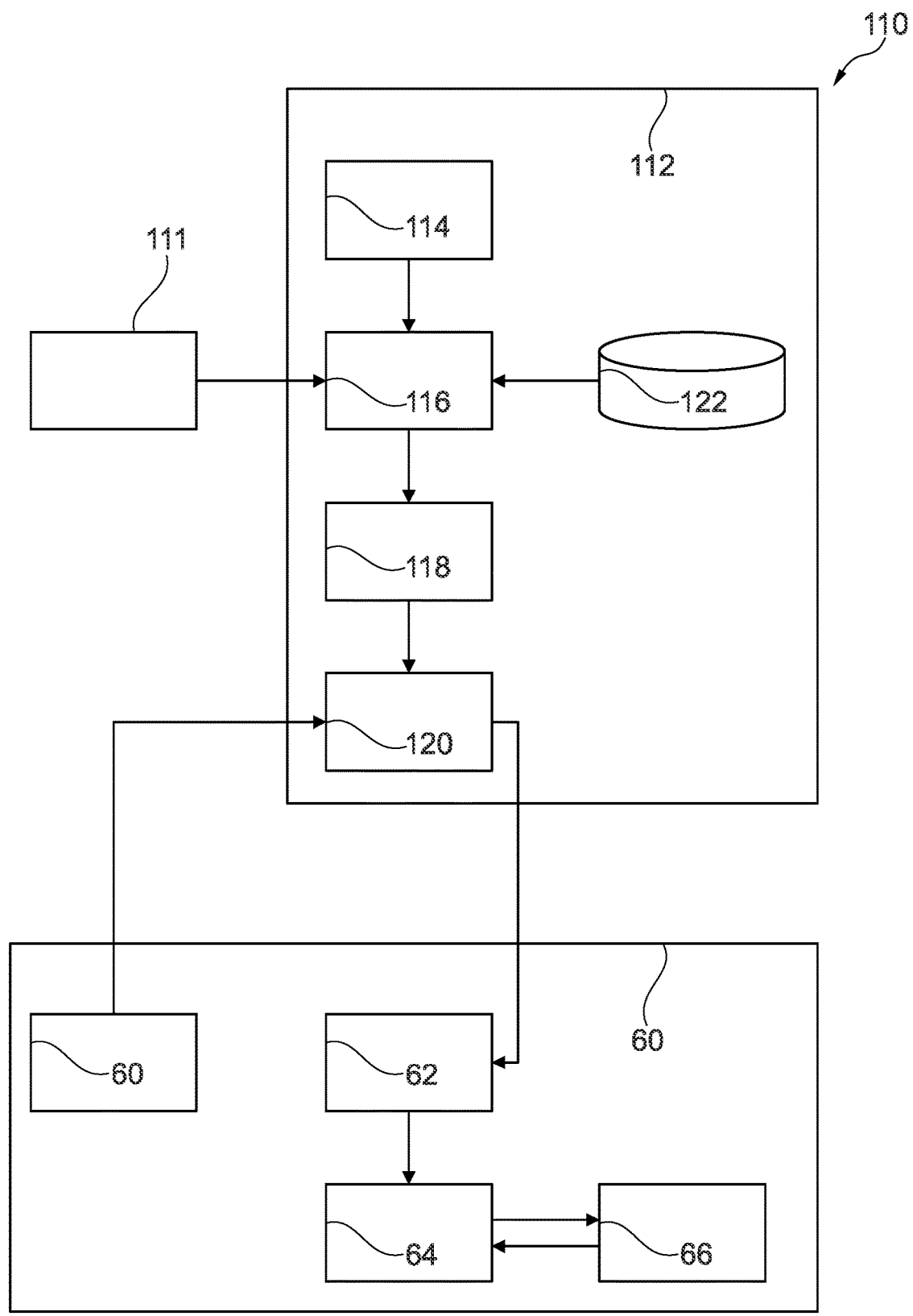
FIG. 8 schematically illustrates an example of a haptic writing system.

FIG. 8 schematically illustrates an example of a haptic writing system 110.

For example, a texture waveform conversion system 112 performs the function of the computer implemented method 10 for computing a plurality of virtual texture waveform definition according to the first aspect. In particular, the user interface 114 facilitates data input from a user. The user interface is embodied on the haptic writing instrument, on an external computing device 80, or on a web service, for example. User preferences may comprise of data concerning the nature of the existing surface, data concerning the nature of the intended surface, and the like.

In an example, the image combiner 116 executes an image combination algorithm to generate a composite image, or likeness, combining the textural features of the existing surface and the intended surface. In an example, the image combination algorithm receives user preferences, image information encoding the characteristics of properties of known surfaces, and optionally texture data gathered from an existing surface by a texture sensor 111 or camera. The camera may be embodied on the haptic writing instrument 50 or an external computing device, for example. In embodiments, the motion sensor 60 of the pen, if capable of recording textures, is configured to obtain and transmit texture data. Texture data may be an image, or multiple images, defining the topology of the surface of the existing or intended texture, characterising parameters encoding the surface properties of the material, and the like. The image combiner 116 is configured to output a composite image that encodes the textural properties of a hypothetical third surface formed of the existing surface and the intended surface, such as by subtracting the existing surface from the desired surface.

Although this example discusses the representation of textures as images, a skilled person will appreciate that in principle, any data format that spatially resolves a texture in respect of a well-defined map to textural frequencies is applied.

The waveform generator 118 computes the virtual texture waveforms definitions on one or more of the haptic writing instrument 50, an external computing device 80 such as the user's smartphone, at a remote server or in a cloud processing service, or in any other suitable location. The waveform generator 118 classifies regions having a similar texture in the virtual texture data, and produce corresponding waveforms.

For example, the waveform generator may obtain as input the virtual texture data, and generates as output a texture waveform definition corresponding to each identified region in the virtual texture data having a similar texture (a texture segment). According to an example, the virtual texture waveform definition may comprise a pair of frequencies which, when generated simultaneously, cause a user of a haptic writing instrument 50 to perceive a texture as a beating effect. The computation of the virtual texture waveforms definitions occur on the haptic writing instrument 50, on an external computing device 80, at a remote server or in a cloud processing service, or in any other suitable location.

The selection and modulation system 120 is configured to select which of the virtual texture waveform definitions to communicate to the at least one actuator 62. A texture segment is selected by comparing haptic writing instrument motion data and resolving a position of the tip 70 of the haptic writing instrument on the existing writing surface and/or an intended writing surface. The selection and modulation algorithm produce an output determination of which virtual texture waveform definition is appropriate to output at a given time. The decision concerning which of the first or second virtual texture waveform definitions to output occur on the haptic writing instrument 50, on an external computing device 80, at a remote server or in a cloud processing service, or in any other suitable location.

Figure 9:
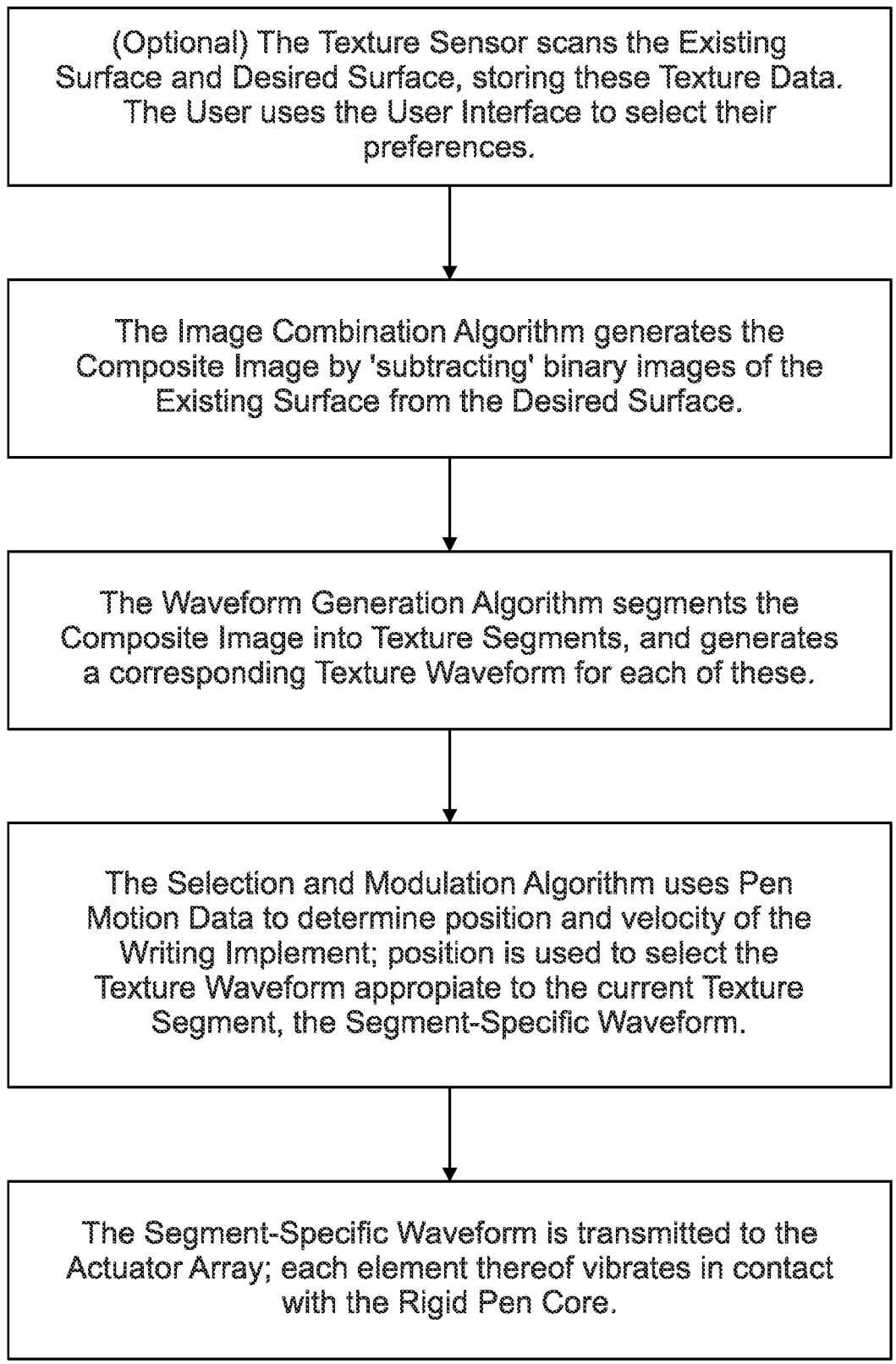
FIG. 9 schematically illustrates an example of a haptic writing system.

FIG. 9 schematically illustrates an example use of a haptic writing system.

Figure 10:
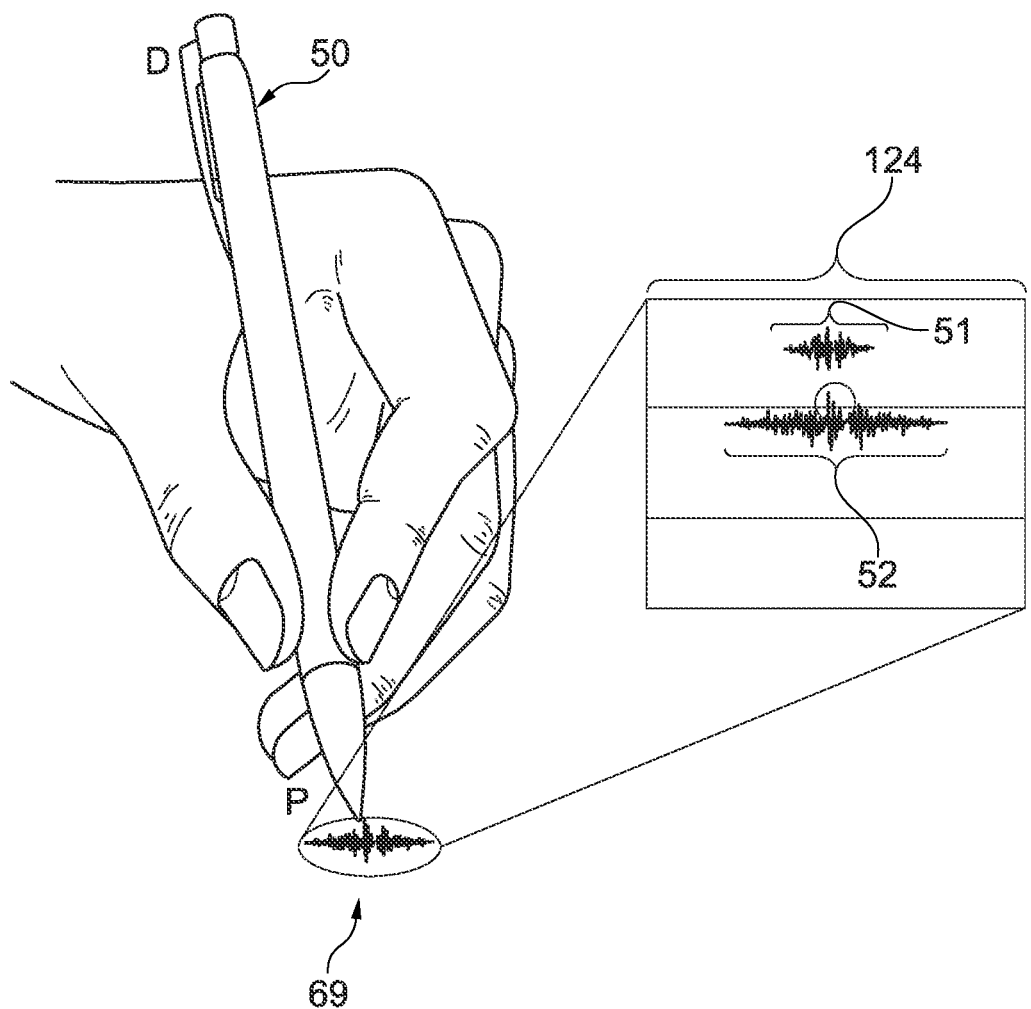
FIG. 10 schematically illustrates an example use of a haptic writing system.

FIG. 10 schematically illustrates an example use of a haptic writing system.

A user holds a haptic writing instrument 50 such that the proximal end P touches the writing surface. An existing writing surface 124 defined by first texture data is adapted to be haptically perceived by the user as an intended writing surface comprising lines and blank portions, for example to enable a partially sighted or blind pen user the sensation of writing on lined paper.

According to a fourth aspect, there is provided a writing system 80 comprising a haptic writing instrument 50 according to the second aspect or its embodiments, an external computing device 80, and a communications network 94 configured to communicably couple the haptic writing instrument and the external computing device. The haptic writing instrument is configured to transmit first texture data characterising a texture of an existing writing surface to the external computing device, and to receive at least first and second virtual texture waveform definitions generated by the external computing device.

According to a fifth aspect, there is provided a computer program element comprising instructions which, when the program is executed by a computer, cause the computer to carry out the method of the first or second aspects.

According to a sixth aspect, there is provided a computer readable medium comprising the computer program element discussed above.

According to a further aspect, there is provided a tablet computer, e-book, or smartphone configured to provide tactile feedback to a user, wherein a surface of the tablet computer, e-book, or smartphone comprise a writing surface 30 according to the second aspect, or its embodiments.

References throughout the preceding specification to "one embodiment", "an embodiment", "one example" or "an example", "one aspect" or "an aspect" means that a particular feature, structure, or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics can be combined in any suitable combinations and/or sub-combinations in one or more embodiments or examples.

| REFERENCE NUMERALS | |
|---|---|
| 10 | computing a plurality of virtual texture waveform definitions |
| 11 | obtaining first texture data |
| 12 | obtaining second texture data |
| 13 | generating virtual texture data |
| 14 | segmenting the virtual texture data |
| 15 | generating texture waveforms |
| 16 | outputting texture waveforms |

-continued

| REFERENCE NUMERALS | |
|---|---|
| 18 | optional texture sensor |
| 20 | waveform generation system |
| 22 | image combination function |
| 24 | waveform generation function |
| 28 | selection and modulation function |
| 30 | user interface |
| 32 | texture database |
| 40 | first texture data |
| 41 | example first texture |
| 42 | second texture data |
| 43 | example second texture |
| 44 | virtual texture data |
| 45 | resultant texture feature |
| 46 | segmented virtual texture data |
| 47a | first region |
| 47b | second region |
| 48 | set of texture types |
| 49 | set of virtual texture waveform definitions |
| S1 | first virtual texture waveform definition |
| S2 | second virtual texture waveform definition |
| 50 | haptic writing instrument |
| 60 | motion sensor |
| 61 | power source |
| 62 | actuator |
| 63 | grip |
| 64 | elongate rigid portion |
| 65 | controller |
| 66 | damper |
| 67 | clip |
| 68 | communication interface |
| 69 | writing surface |
| 70 | Tip portion |
| P | Proximal end of haptic writing instrument |
| D | Distal end of haptic writing instrument |
| 80 | external computing device |
| 81 | processor |
| 82 | processor software |
| 83 | main memory |
| 84 | software in main memory |
| 85 | volatile memory |
| 86 | software in volatile memory |
| 87 | user display |
| 88 | user input device |
| 89 | non-volatile memory |
| 90 | machine readable medium |
| 91 | software in non-volatile memory |
| 92 | communication interface |
| 94 | wireless communications network |
| 95 | wired communications network |
| 96 | networked database |
| 100 | using a haptic writing instrument |
| 102 | obtaining |
| 104 | detecting |
| 106 | generating |
| 108 | actuating |
| 110 | Haptic writing system |
| 111 | Optional texture sensor |
| 112 | Texture to waveform converter |
| 114 | User interface |
| 116 | Image combiner |
| 118 | Waveform generator |
| 120 | Selection and modulation system |
| 122 | Texture database |
| 124 | Existing writing surface |

The invention claimed is:

1. A computer implemented method for computing a plurality of virtual texture waveform definitions, comprising:
   obtaining first texture data at least partially characterising a texture of an existing writing surface;
   obtaining second texture data at least partially characterising an intended texture to be experienced by a user of a haptic writing instrument when writing on the existing writing surface, wherein the second texture data is defined by a one-dimensional signal including a periodic displacement that occurs for a fraction of each movement cycle as the haptic writing instrument moves across the existing writing surface;
   generating virtual texture data by modifying the first texture data based on at least the second texture data, wherein the virtual texture data includes a hypothetical surface generated by performing a per pixel multiplication of the intended texture with corresponding inverted pixels of the existing writing surface;
   segmenting the virtual texture data into at least first and second regions representing, respectively, at least a first texture type and a second texture type;
   generating at least first and second virtual texture waveform definitions corresponding, respectively, to the first and second texture types; and
   outputting at least the first and second virtual texture waveform definitions.

2. The computer implemented method of claim 1, wherein generating the virtual texture data by modifying the first texture data based on at least the second texture data comprises:
   subtracting the first texture data from the second texture data.

3. The computer implemented method of claim 1, wherein generating the virtual texture data by modifying the first texture data based on at least the second texture data further comprises:
   inverting the first texture data and adding the inverted first texture data to the second texture data.

4. The computer implemented method of claim 1, wherein the first texture data and the second texture data are represented by a bitmap image of the existing writing surface or a writing surface experienced by the user of the haptic writing instrument when writing on the existing writing surface, respectively.

5. The computer implemented method of claim 1, wherein segmenting the virtual texture data into at least a first region and a second region comprises:
   performing edge detection on the virtual texture data to identify the at least first and second regions of the virtual texture data characterised by at least first and second respective spatial frequencies falling within corresponding first and second frequency ranges; and
   labelling the at least first and second regions of the virtual texture data as at least first and second texture segments, respectively.

6. The computer implemented method of claim 1, wherein generating at least first and second virtual texture waveform definition corresponding, respectively, to the first and second texture types further comprises:
   generating the first virtual texture waveform definition comprising a first beat frequency and a first carrier frequency based on the first texture type; and
   generating the second virtual texture waveform definition comprising a second beat frequency and a second carrier frequency based on the second texture type.

7. The computer implemented method of claim 6, wherein the first texture waveform, when provided as a first drive signal of an actuator of the haptic writing instrument, is capable of inducing a beating effect in the haptic writing instrument at a first frequency, and the second texture waveform, when provided as a second drive signal of the actuator of the haptic writing instrument, is capable of inducing the beating effect in the haptic writing instrument at a second frequency.

8. The computer implemented method of claim 1, further comprising:
   obtaining, via a remote texture database, at least first or second virtual texture waveform definitions based on the first or second texture data, respectively.

9. A method of using a haptic writing instrument configured to provide tactile feedback to a user, comprising:
   obtaining first texture data at least partially characterising a texture of an existing writing surface;
   obtaining second texture data at least partially characterising an intended texture to be experienced by the user of the haptic writing instrument when writing on the existing writing surface, wherein the second texture data is defined by a one-dimensional signal including a periodic displacement that occurs for a fraction of each movement cycle as the haptic writing instrument moves across the existing writing surface;
   generating virtual texture data by modifying the first texture data based on at least the second texture data, wherein the virtual texture data includes a hypothetical surface generated by performing a per pixel multiplication of the intended texture with corresponding inverted pixels of the existing writing surface;
   segmenting the virtual texture data into at least first and second regions representing, respectively, at least a first texture type and a second texture type;
   generating at least first and second virtual texture waveform definitions corresponding, respectively, to the first and second texture types;
   obtaining, at a controller of the haptic writing instrument, at least the first and second virtual texture waveform definitions;
   detecting a motion of the haptic writing instrument from a first location to a second location of the existing writing surface using at least one motion sensor of the haptic writing instrument;
   generating either a first or a second actuator drive signal using either the first virtual texture waveform definition or the second virtual texture waveform definition, based on the motion detected by the at least one motion sensor; and
   actuating at least one actuator of the haptic writing instrument using either the first or second actuator drive signals, thereby inducing a force against a portion of the user of the haptic writing instrument, enabling the user to experience the intended texture via the haptic writing instrument when writing on the existing writing surface when, in use, the haptic writing instrument is translated from the first location to the second location of the existing writing surface.

10. The method of claim 9, further comprising:
   inferring a location of the haptic writing instrument upon the existing writing surface using the motion detected by the at least one motion sensor of the haptic writing instrument;
   referencing the inferred location of the haptic writing instrument to a region comprised in a plurality of regions represented by the at least first and second virtual texture waveform definitions; and generating either the first or the second actuator drive signal based on the texture segment referenced to the inferred location of the haptic writing instrument.

11. The method of claim 9, further comprising:

detecting a displacement of the haptic writing instrument from the first location to the second location of the existing writing surface using the at least one motion sensor of the haptic writing instrument; and modifying at least the first and second virtual texture waveform definitions to compensate for a change in an apparent texture caused by the haptic writing instrument moving between the first and second locations.

12. The method of claim 9, further comprising:

configuring the haptic writing instrument into a texture collection mode to record the texture of an existing surface or an intended surface.

13. The method of claim 9, further comprising:

detecting, by the controller via the at least one motion sensor, a period of inactivity for a predetermined time threshold; and configuring, by the controller, the haptic writing instrument into a low power mode or a sleep mode.

14. The method of claim 9, further comprising:

tracking, by the controller, position of a tip of the haptic writing instrument on an existing surface; and updating, by the controller, virtual map of an intended writing surface, wherein coordinates of the existing surface are registered to the coordinates of the intended writing surface.

15. The method of claim 9, wherein generating the virtual texture data by modifying the first texture data based on at least the second texture data comprises:

subtracting the first texture data from the second texture data.

16. The method of claim 9, wherein generating the virtual texture data by modifying the first texture data based on at least the second texture data further comprises:

inverting the first texture data and adding the inverted first texture data to the second texture data.

17. A haptic writing instrument configured to provide tactile feedback to a user, comprising:

an elongate body portion enabling a user to grip the haptic writing instrument, wherein the body portion comprises a proximal end and a distal end, the proximal end configured, in use, to contact region of a writing surface;

an elongate rigid portion comprised, at least partially, within the elongate body portion;

at least one damper configured to attach the elongate rigid portion to the elongate body portion;

at least one actuator configured to displace the elongate rigid portion, wherein the at least one actuator is configured to vibrate at one or more frequencies;

at least one motion sensor configured to detect motion of the haptic writing instrument relative to the writing surface and to output at least one motion signal to a controller; and the controller configured to receive the at least one motion signal, and to generate a first or a second actuator drive signal for controlling the at least one actuator based on a combination of the at least one motion signal and either of a first or second virtual texture waveform definitions comprised in a data record accessible to the controller, thereby causing the user of the haptic writing instrument to feel an intended texture via the motion of the haptic writing instrument when the haptic writing instrument is translated from a first location to a second location of existing writing.

18. The haptic writing instrument of claim 17, further comprising:

a wireless communication interface coupled to the controller;

wherein the controller is configured to transmit the at least one motion signal to an external computing device, and to receive the first or the second actuator drive signal from the external computing device; or wherein the controller is configured to receive the first or the second virtual texture waveform definitions from the external computing device, and to compute the first or the second actuator drive signal.

19. The haptic writing instrument of claim 17, wherein the elongate rigid portion is in vibrational contact with a surface that generates a texture of an existing writing surface, and wherein the elongate rigid portion transmits vibrations induced by changing the texture on the existing writing surface to the at least one actuator.

20. The haptic writing instrument of claim 17, wherein the at least one damper comprises rubber, magnets, or a liquid or gel material.

* * * * *